United States Patent [19]
Wahrén

[11] Patent Number: 4,895,248
[45] Date of Patent: Jan. 23, 1990

[54] CONVEYOR BELT CHAIN

[76] Inventor: Mats E. Wahrén, Huvudstagatan 4, Vadstena, Sweden, S-59200

[21] Appl. No.: 295,120

[22] Filed: Jan. 9, 1989

[30] Foreign Application Priority Data

Jan. 8, 1988 [SE] Sweden ................................ 8800037

[51] Int. Cl.⁴ .............................................. B65G 17/06
[52] U.S. Cl. ...................................... 198/852; 474/210
[58] Field of Search ....................... 198/853, 851, 852; 474/154, 203, 210, 211, 212, 207

[56] References Cited

U.S. PATENT DOCUMENTS

| | | | |
|---|---|---|---|
| 1,965,285 | 7/1934 | Gilstad | 474/210 |
| 3,334,726 | 8/1967 | Fredrikson | 198/852 |
| 3,768,631 | 10/1973 | Wahren | 474/211 X |

Primary Examiner—Robert J. Spar
Assistant Examiner—Cheryl L. Gastineau
Attorney, Agent, or Firm—Helfgott & Karas

[57] ABSTRACT

A conveyor belt chain comprises identical links, preferably made of acetal. Each link has a cylindrical head (2) and two legs (3) extending in "V"-form from the head. Between the outer ends of these legs the head (2) of a next adjacent link is coupled for relative movement of the links in horizontal and vertical planes. A part-cylindrical sleeve (10) of a material differing from that of the links is rotatable about the axis of the cylindrical head (10) and provided with external, diametrically opposed bearing surfaces (12) for engaging bearing surfaces (15) on the legs (3), said bearing surfaces extending in right angle to an axis perpendicular to the axis of the head. The sleeve (10) eliminates direct contact between the links with accompanying friction problems in their relative rotation.

6 Claims, 2 Drawing Sheets

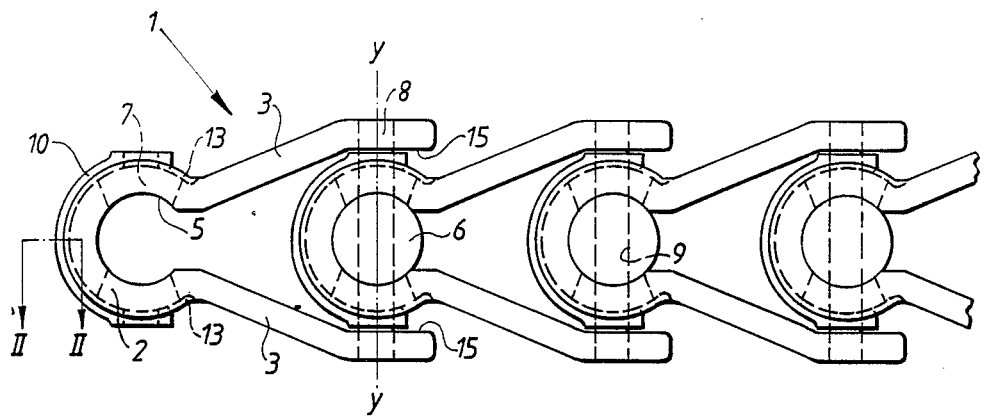
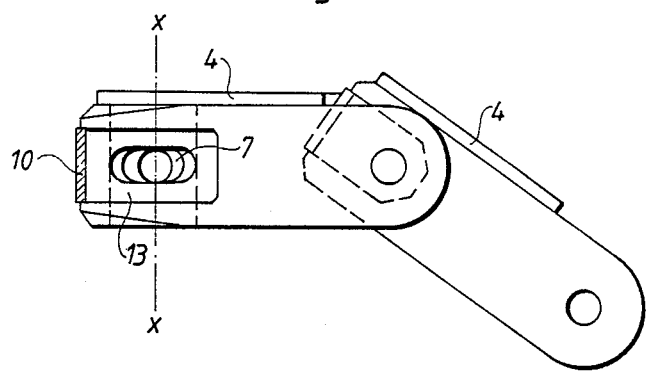
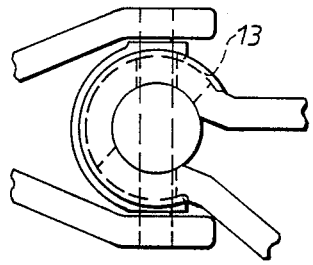
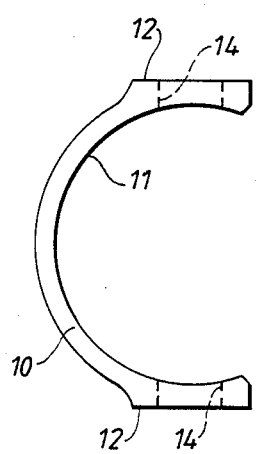

CONVEYOR BELT CHAIN

The present invention relates to a conveyor belt chain having identical links each comprising a cylindrical head and two legs extending in "V"-form from the head and receiving between their outer free ends the cylindrical head of a next adjacent, pivotably connected link, connection being provided by means of a coupling device allowing the links to pivot in relation to each other about the axis of the cylindrical head as well as about an axis perpendicularly intersecting said cylindrical head axis.

A conveyor chain of this type is disclosed in the U.S. Pat. No. 3 768 631. Such conveyor chains have found wide-spread industrial use for transport of objects of manufacture between various working stations in serial production and in the food and the pharmaceutical industries for transport of packed products and for similar purposes where mass-produced articles are to be transported within an industrial plant. Such a conveyor chain is guided rectilinearly along guiding rails and in curves horizontally and vertically over sprockets. The conveyor chain is set in motion by drive gears engaging the chain where it passes a driving station.

The links of the conveyor chain is usually made of a synthetic material, such as acetal. The links may be pivotably interconnected for relative movement in horizontal and vertical planes, for example, by means of a coupling device as disclosed in greater detail in said U.S. Patent Specification, to which reference is made. Under heavier load and at the comparatively high conveyor velocities now occurring a friction problem arises in that the contact surfaces of the links rub when the links pivot. Hereby a very disturbing squeaking noise is generated when the links pivot horizontally as well as vertically. This squeaking noise is attributed to the fact that the friction surfaces of the links, which consists of the same synthetic material, do not cooperate satisfactorily as bearing surfaces. The surfaces rub against each other while generating said disturbing noise.

In practice it has been very difficult to bring about a satisfactory lubrication of the bearing surfaces, as an externally supplied lubricant in many cases cannot be used or, if such use is possible, the lubricant will be washed away by a surrounding damp atmosphere etc. Attempts have been made to make the links self-lubricating by intermixing a suitable lubricant in the link material, but hitherto neither this solution has proved satisfactory.

As indicated above the basic problem resides in the fact that contact surfaces of cooperating parts made of the same synthetic material are working against each other, sometimes under a comparatively large surface pressure. Conveyor chains of the above defined type according to said U.S. patent specification operate very satisfactorily per se desregarding said friction problem and have the advantage of a generally simple structure making a very economic manufacture of the chain possible. The chain participates as a main element—usually of considerable length—in the large internal conveyor plants now used, and for economical reasons it does not permit any complex arrangements for eliminating the inconveniences mentioned above.

The invention has for its object to provide a simple solution of the present bearing problem arising when interconnecting the links of the conveyor chain described in the introduction. This solution is characterized by a part-cylindrical sleeve having an internal part-cylindrical bearing surface in slidable contact with the cylindrical outside of the link head for rotation about the axis of the head, and two diametrically opposed bearing surfaces on its outside which slidably engage inner, opposing bearing surfaces on the end portions of the legs of the associated link to guide the link head about the intersecting axis in any angular position taken by the bearing sleeve when turning about the link head, the bearing sleeve consisting of a material differing from that of the link.

If, for example, the links consist of a synthetic material such as acetal, the sleeve can advantageously be made to of a polyamide, polyethene, polypropylene, polyester or another plastics material having similar bearing properties and a good wear resistance. It is essential that the sleeve consists of another material than the links. Also a sleeve of metal, having otherwise suitable mechanical properties, can be used to advantage.

The bearing sleeve according to the invention is, per se, a very simple detail which can be introduced without difficulty in the coupling between the links and which will not raise essentially the manufacturing cost of the conveyor chain.

An embodiment of the invention will be described below by way of example with reference to the accompanying drawings. For supplementary details of the conveyor chain reference is made to the said U.S. patent specification.

FIG. 1 shows the conveyor chain according to the invention seen from the bottom side of the chain, the actual carrier surface of the links being omitted.

FIG. 2 is a side view showing two links of the conveyor chain with one link pivoted downwards while the chain is guided vertically over a sprocket, the bearing sleeve being cut along the line II—II in FIG. 1.

FIG. 3 is a fragmentary view of the conveyor chain showing the connection between two links pivoted horizontally in relation to one another.

FIGS. 4 and 5 are an end view and a lateral view, respectively, of a first embodiment of the bearing sleeve, on a larger scale.

Figure 6:
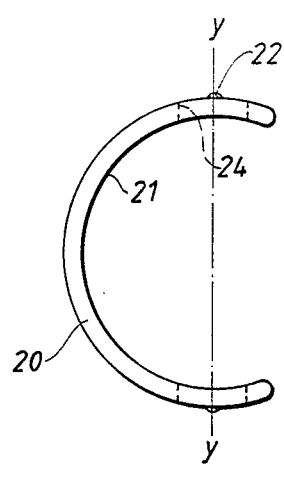
FIGS. 6 and 7 are an end view and a lateral view, respectively, of a simplified bearing sleeve design, on a larger scale.

The conveyor chain conprises links 1, each having an essentially cylindrical head portion 2 with legs 3, 3 extending therefrom in "V" form. A loading surface or carrier plane 4 is associated with the top side of the links, as shown diagrammatically in FIG. 2. These main parts of the link form a unit integrally moulded of synthetic material, such as acetal or a similar commercially available material suitabel for the purpose. The cylindrical head 2 has an aperture 5 concentric with the axis x—x of the head. In this aperture a cylindrical bushing 6 is accommodated, which consists of a material having suitable bearing properties with respect to the surface of the aperture 5. A bearing pin 8, e.g. of steel material, extends through the bushing 6. This bearing pin 8 is rigidly secured in the end portions of the legs 3 but movably carried in the bushing 6. The axis y—y of the bearing pin 8 intersects the axis x—x of bushing 6 at right angle. The bearing pin 8 extends freely through oblong side openings 7—7 in the head 2, allowing the head to rotate a limited angle in relation to the bearing pin 8 and thus to the link in which the bearing pin 8 is rigidly secured.

FIG. 2 illustrates the relative position of two links upon rotation about the axis y—y of the bearing pin 8, whereas FIG. 3 illustrates the relative position of two links after having been rotated about the axis x—x of the head portion 2.

In a conveyor chain according to the U.S. Pat. No. 3 768 631 mentioned above the outside of head portion 2 engages the inside of the respective legs of the next adjacent link. When the chain is under heavy load, which occurs in particular at its drive station, but also when the chain is lead in curves and then bent in horizontal and vertical planes, the legs tend to deflect inwards, against the head portion of the adjacent link, a situation wherein considerable surface pressures may be generated. Now, in the relative horizontal and vertical pivoting of the links the above mentioned rubbing of the contact surfaces of the links occurs with the accompanying squeaking noise, sometimes a very strong such noise. In order to eliminate this inconvenience there is provided according to the invention a part-cylindrical sleeve 10, which is received in a peripheral groove 13 in the head portion 2. The groove includes an angle about axis x—x which exceeds sufficiently the angle included by the sleeve 10 in order that it be possible to turn the sleeve about the head portion an angle corresponding to the relative pivot angle of the links in either direction from the centre line of the chain. The sleeve 10 has a lateral bore or cross bore 14 through which the bearing pin 8 extends. Hereby the sleeve 10 will follow the associated pin and link in their turning movement in relation to the link head portion 2 which is enclosed by the sleeve. On its external surface the sleeve 10 has two diametrically opposed flat bearing surfaces 12, 12 extending about the bore 14 with its bearing pin 8, perpendicular thereto. These bearing surfaces 12, 12 engage opposing bearing surfaces 15, 15 on the internal surface of the legs of the associated link. Thus the sleeve 10 is slidably carried, on the one hand with its internal cylindrical bearing surface 11 against the groove 12 for turning about axis x—x and, on the other hand with its external bearing surfaces 12, 12 slidably engaging the bearing surfaces 15, 15 of the legs for pivoting about axis y—y. By the feature that the sleeve 10 is not made of the same material as links 1 a satisfactory bearing arrangement between the links of the coupling device is attained, as mutually different materials having suitable, compatible bearing properties can operatively engage one another. For example, if the links are made of acetal, the sleeve 10 can be made of e.g. polyamide, polyethene, polypropene, polyester or another similar material having low friction coefficient and a good wear resistance. It is also possible to make the sleeve 10 of some suitable metal, such as aluminum bronze or the like, or of die-casted steel. The sleeve can also be made of a steel material having a coating of a suitable plastics material in accordance with the above.

The bearing arrangement between the bushing 6 and the link head 2 poses no problem as the bushing 6 can be made of another material than the link, e.g. of polyamide, polyethene, polypropene or polyester. Neither does the bearing arrangement between the bushing 6 and the bearing pin 8 pose any problem, for similar reasons.

Figure 8:
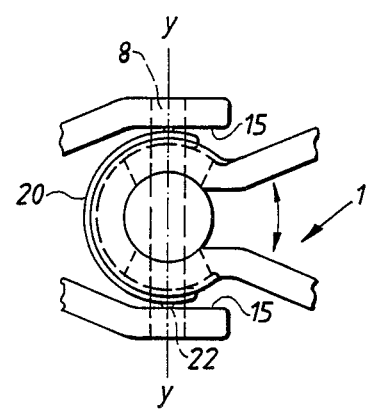
FIG. 8 is a fragmentary view of the conveyor chain using the simplified bearing sleeve in the link coupling.
Figure 7:
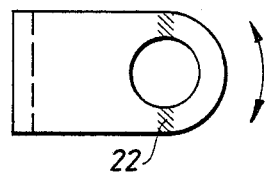

FIGS. 6–8 shows an embodiment of the bearing sleeve, further simplified. In this case, as before, the sleeve 20 has an internal part-cylindrical bearing surface 21 for slidable engagement in the groove 13 about the head 2 and a lateral bore 24 through which the bearing pin 8 extends. However, the outside of the sleeve 20 is cylindrical all the way following coaxially the internal part-cylindrical bearing surface 21. This simplified design facilitates manufacture of the sleeve 20. As seen from FIG. 8 the cylindrical outside of the sleeve 20 will engage the opposite bearing surfaces 15, 15 on the inside of the legs of the adjacent link, an engagement which is linear in principle. Due to the elastic deformation of the material of the intergaging parts (legs 3, sleeve 20) there is formed narrow contact portions 22, which will serve as bearing surfaces when the sleeve 20 is rotated about the axis y—y of the bearing pin 8, as shown by the double arrow in FIG. 7.

In this last mentioned case the bearing arrangement between the sleeve 20 and the groove 13 will operate in the same way as disclosed in the aforegoing.

I claim:

1. A conveyor belt chain having identical links each comprising a cylindrical head (2) and two legs (3) extending from the head in "V"-form and receiving between their outer free ends the cylindrical head of a next adjacent pivotably connected link (1), connection being provided by means of a coupling device allowing the links to pivot in relation to each other about the axis of the cylindrical head as well as about an axis perpendicularly intersecting said cylindrical head axis, spacing means being introduced between the ends of the legs and the cylindrical head, received therebetween, of a next adjacent link, characterized by a part-cylindrical sleeve (10, 20) having an internal part cylindrical bearing surface (11, 21) in slideable contact with the cylindrical outside of the cylindrical head (2), said sleeve serving as spacing means between the ends of the legs to guide and carry the cylindrical head therebetween in the direction of the intersecting axis (y—y) and as bearing means having a bearing surface (11, 21) partly enclosing the cylindrical head (2) to guide the cylindrical head in pivoting about its axis (x—x), the bearing sleeve (10, 20) consisting of a material differing from that of the link.

2. A conveyor chain according to claim 1, characterized in that the links (1) consist of acetal whereas the sleeve (10, 20) consists of polyamide, polyethene, polypropylene, polyester, or a plastics material having similar bearing properties and a good wear resistance.

3. A conveyor chain according to claim 1, characterized in that the links (1) consist of acetal whereas the sleeve (10, 20) consists of metal.

4. A conveyor chain according to claim 1, characterized in that the links (1) consist of acetal whereas the sleeve consists of a steel material having a coating of polyamide, polyethene, polypropene, polyester, or a plastics material having similar bearing properties and a good wear resistance.

5. A conveyor chain according to any of claim 1, characterized in that the bearing sleeve (10) had diametrically opposed flat bearing surfaces (12, 12) to engage bearing surfaces (15, 15) of an adjacent link.

6. A conveyor chain according to any of claim 1, characterized in that the bearing sleeve (20) is defined by an external part-cylindrical surface concentric with the internal part-cylindrical bearing surface (21) to engage, in an approximately linear fashion, bearing surfaces (15, 15) of an adjacent link.

* * * * *